Sept. 22, 1931.      B. C. RHODES ET AL      1,824,234
TRUCK
Filed July 17, 1928.      2 Sheets-Sheet 1

Benjamin C. Rhodes
& Clarence W. Conroe
INVENTOR.

BY
ATTORNEYS.

Sept. 22, 1931.     B. C. RHODES ET AL     1,824,234

TRUCK

Filed July 17, 1928     2 Sheets-Sheet 2

Benjamin C. Rhodes
Clarence W. Conroe
INVENTOR.

BY *[signature]*
ATTORNEYS.

Patented Sept. 22, 1931

1,824,234

UNITED STATES PATENT OFFICE

BENJAMIN C. RHODES AND CLARENCE W. CONROE, OF CAMBRIDGE SPRINGS, PENNSYLVANIA, ASSIGNORS TO BLYSTONE MANUFACTURING COMPANY, OF CAMBRIDGE SPRINGS, PENNSYLVANIA, A CORPORATION OF PENNSYLVANIA

TRUCK

Application filed July 17, 1928. Serial No. 293,427.

In some forms of trucks it is desirable to increase or diminish the wheel span. As an example of such a truck we have illustrated a truck carrying a mixer machine adapted for use in mixing plaster. In transporting such machine from place to place it is desirable to have a wide enough wheel span to give the vehicle stability. On the other hand, it is desirable to have such an apparatus capable of being moved into a room through the ordinary width of door-way. The present invention is designed to provide a truck capable of adjustment as to the wheel span. Features and details of the invention will appear from the specification and claims.

A preferred embodiment of the invention is illustrated in the accompanying drawings as follows:—

Figure 1:
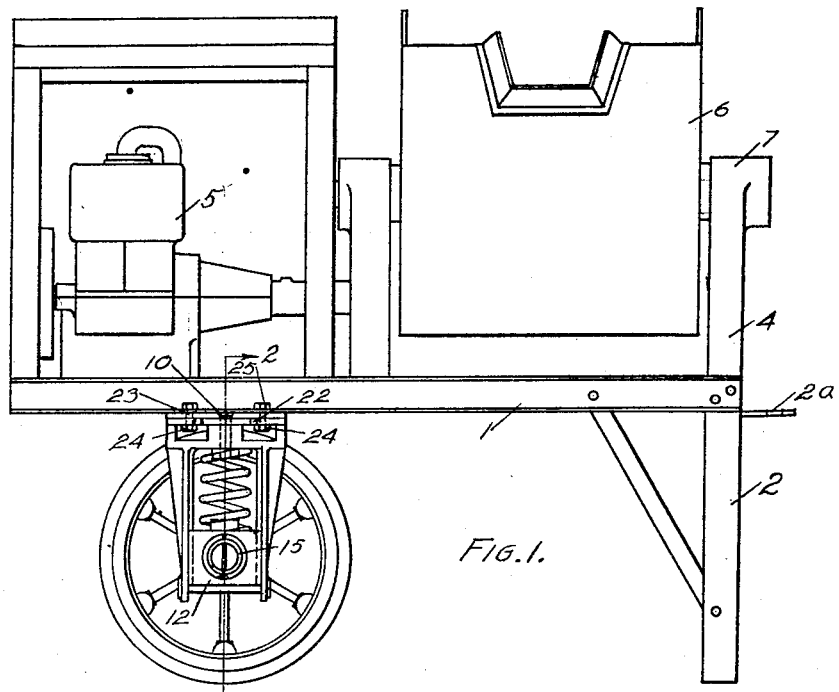

Fig. 1 shows a side elevation of the truck.

Figure 2:
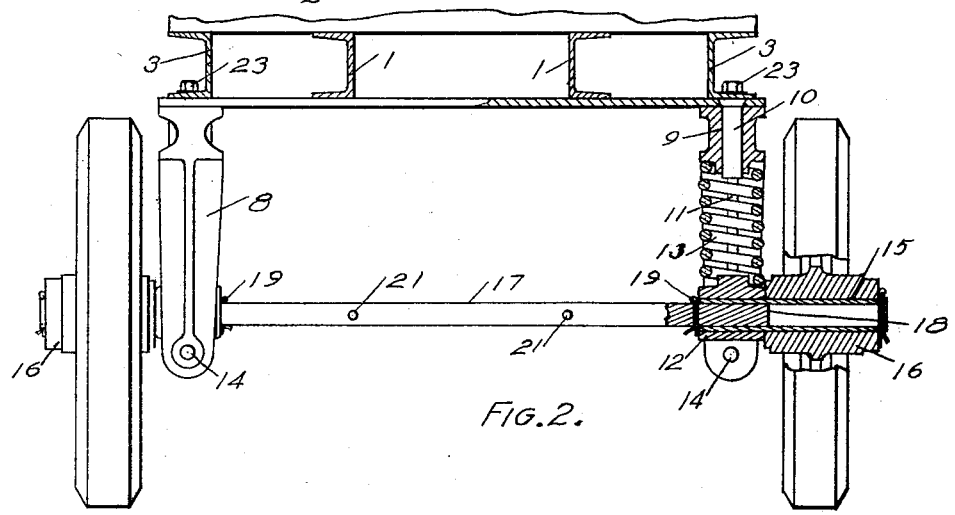

Fig. 2 a section on the line 2—2 in Fig. 1 with the wheels set for wide span.

Figure 3:
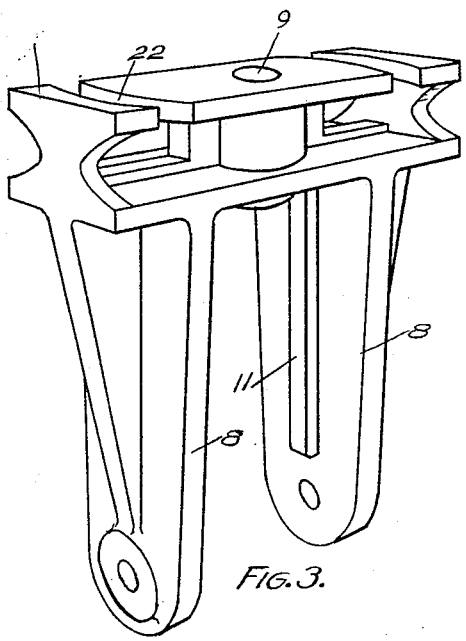

Fig. 3 a perspective view of one of the wheel supporting posts.

Figure 4:
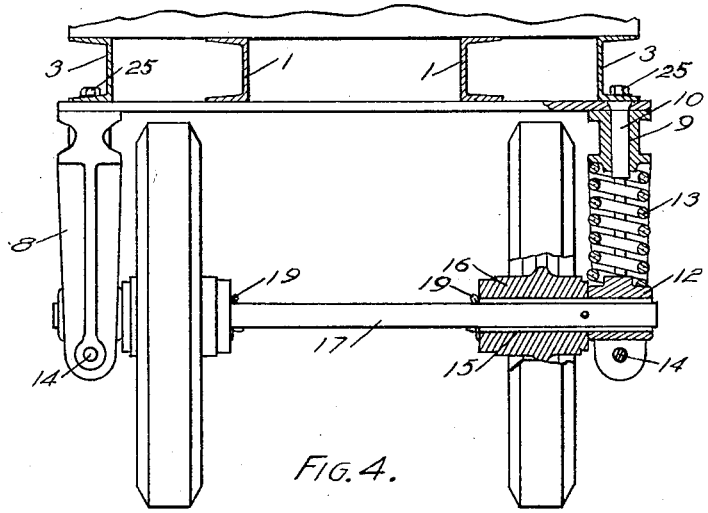

Fig. 4 an end view of the truck, partly in section, the wheels being set at either span.

The frame has the longitudinal beams 1, front posts or legs 2 and a coupling plate 2a by means of which the front end may be attached to the rear end of an ordinary truck lifting the front legs off the ground. Auxiliary side beams 3 are arranged each side of the longitudinal beams 1 and these are connected with the longitudinal beam 1 by cross members of the frame, such as the posts 4 and the frame of the engine 5. A mixer 6 is mounted on the posts 4 by means of the usual trunnions 7 and the mixer is driven from the engine by any suitable means in the usual manner.

Wheel supporting posts 8 have a central opening 9 at their upper ends into which pins 10 extend, the pins 10 being secured in and extending downwardly from the frame. The posts 8 are forked and have the guide ribs 11 on the inner faces of the forks. A wheel mounting 12 is slidingly mounted in the forks on the guide ribs 11. Springs 13 are arranged between the upper parts of the posts and the wheel mountings 12, each mounting being held in the forks by a cross pin 14.

Hollow pins 15 are fixed in the mountings 12 and extend to one side of the posts and wheels 16 are journaled on the pins, or spindles. A rod 17 extends across the truck and into the hollow spindles terminating at 18. The rod is locked in position by cotter pins 19 extending through openings in the rod 17.

When it is desired to reduce the span of the wheels the cotter pins 19 are removed, the rod 17 withdrawn through one or the other of the pins 15 and the wheels are reversed, the posts being swung to carry the pins to the inside of the post, as shown in Fig. 4. The rod is then again inserted and is provided with openings 21 through which the cotter pins 19 are placed locking the rod in place.

In order to give rigidity to the posts they are rigidly clamped to the frame. The posts are provided with a double wall at the top, the upper part of the double wall being slotted at 22. Bolts 23 extend through the frame, the head 24 of the bolt being under the upper portion of the wall and the shank of the bolt extending through the slot 22. Nuts 25 are arranged above a portion of the frame by means of which the bolts may be tightened, thus giving rigidity to the connection between the posts and the frame.

What is claimed as new is:—

1. In a truck, the combination of a frame; wheel supporting posts swiveled on the frame; hollow pins extending laterally from the posts; wheels journaled on the pins; and a rod extending into the hollow pins.

2. In a truck, the combination of a frame; wheel supporting posts swiveled on the frame; hollow pins extending laterally from the posts; wheels journaled on the pins; and a rod extending into the hollow pins and insertable through one of the pins.

3. In a truck, the combination of a frame; wheel supporting posts swiveled on the frame; hollow pins extending laterally from the posts; wheels journaled on the pins; a rod extending into the hollow pins; and detachable means locking the rod in place.

4. In a truck, the combination of a frame; wheel supporting posts swiveled on the frame; wheels journaled on the posts off-center from the swivel axes; and means locking the posts swung with the wheels arranged outwardly or inwardly from the swivel axes.

5. In a truck, the combination of a frame; wheel supporting posts swiveled on the frame; wheels journaled on the posts off-center from the swivel axes; and means locking the posts swung with the wheels arranged outwardly or inwardly from the swivel axes comprising a slot at the upper end of each post and bolts extending through said slots and secured to the frame.

6. In a truck, the combination of a frame; wheel supporting posts swiveled on the frame, said posts being forked and having guide ribs on the inner faces of the forks; wheel supports slidingly mounted on the ribs; pins extending laterally from the wheel supports; wheels on the pins off-set from the axes of the posts, said posts being reversible to permit the swinging of the wheels in and out to vary the span between the wheels; and springs arranged between the tops of the forks and the wheel supports.

7. In a truck, the combination of a frame; wheel supporting posts swiveled on the frame, said posts being forked and having guide ribs on the inner faces of the forks; wheel supports slidingly mounted on the ribs; pins extending laterally from the wheel supports; wheels on the pins off-set from the axes of the posts, said posts being reversible to permit the swinging of the wheels in and out to vary the span between the wheels; springs arranged between the tops of the forks and the wheel supports; and means for permitting the reversal of the posts.

8. In a truck, the combination of a frame; wheel supporting posts swiveled on the frame, said posts being forked and having guide ribs on the inner faces of the forks; wheel supports slidingly mounted on the ribs; pins extending laterally from the wheel supports; wheels on the pins; springs arranged between the tops of the forks and the wheel supports; and means for permitting the reversal of the posts comprising a double wall structure at the upper end of the posts, slots in the upper parts of the double wall, and bolts extending through the slots into the frame.

9. In a truck, the combination of a frame; wheel supporting posts swiveled on the frame at each side of the frame; axle pins extending radially from the post at one side only of each post; and wheels journaled on the pins, said posts permitting the reversal of the pins in and out to vary the span between the wheels, the in and out position of the pins being on approximately the same axis.

10. In a truck, the combination of a frame; wheel supporting posts swiveled on the frame at each side of the frame; and wheels journaled on the posts with a single wheel on each post off-center in the direction of the axis of the wheel from the swivel axis, said wheels being reversible about the post and spaced apart in both positions and a line through the posts extending through the wheels in both positions.

In testimony whereof we have hereunto set our hands.

BENJAMIN C. RHODES.
CLARENCE W. CONROE.